US012319511B2

(12) United States Patent
Ishihara et al.

(10) Patent No.: US 12,319,511 B2
(45) Date of Patent: Jun. 3, 2025

(54) DEVICE FOR ATTACHING AND DETACHING ROLLER, AND BELT CONVEYOR INCLUDING THE DEVICE

(71) Applicants: Hiroki Ishihara, Kanagawa (JP); Kohki Asada, Tokyo (JP); Teppei Kikuchi, Kanagawa (JP); Kenji Nozawa, Kanagawa (JP); Takehiro Nakamura, Ibaraki (JP)

(72) Inventors: Hiroki Ishihara, Kanagawa (JP); Kohki Asada, Tokyo (JP); Teppei Kikuchi, Kanagawa (JP); Kenji Nozawa, Kanagawa (JP); Takehiro Nakamura, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 89 days.

(21) Appl. No.: 18/125,221

(22) Filed: Mar. 23, 2023

(65) Prior Publication Data

US 2023/0303333 A1    Sep. 28, 2023

(30) Foreign Application Priority Data

Mar. 23, 2022    (JP) ................................ 2022-047027

(51) Int. Cl.
*B65G 39/02*    (2006.01)
*B41J 13/08*    (2006.01)
(Continued)

(52) U.S. Cl.
CPC .............. *B65G 39/02* (2013.01); *B41J 13/08* (2013.01); *B65G 23/44* (2013.01); *B65H 5/023* (2013.01); *B65H 2601/324* (2013.01)

(58) Field of Classification Search
CPC .......... B65G 39/02; B65G 23/44; B41J 13/08; B65H 5/023; B65H 2601/324
See application file for complete search history.

(56) References Cited

U.S. PATENT DOCUMENTS

| 5,213,322 A | * | 5/1993 | Matsuo | ................... G03G 15/60 |
| | | | | 355/75 |
| 5,292,113 A | * | 3/1994 | Morigami | .............. G03G 15/60 |
| | | | | 271/7 |

(Continued)

FOREIGN PATENT DOCUMENTS

| JP | 7-010237 | 1/1995 |
| JP | 8-324744 | 12/1996 |

(Continued)

*Primary Examiner* — Mark A Deuble
(74) *Attorney, Agent, or Firm* — XSENSUS LLP

(57) ABSTRACT

A device attaches and detaches at least one of rollers in a belt conveyor in which an endless belt is wound around the rollers between a front plate and a rear plate of the belt conveyor. The device includes a guide and a roller holder. The guide has a base end and extends along a longitudinal direction of the detachable roller and includes a guide groove. The roller holder holds the detachable roller and includes an engagement portion, another engagement portion, and a guided portion. The engagement portion detachably engages with the front plate. The other engagement portion detachably engages with the rear plate. The guided portion slides along the guide groove toward the rear side or the front side of the device to engage or disengage the engagement portion with or from the front plate and engage or disengage the other engagement portion with or from the rear plate.

20 Claims, 11 Drawing Sheets

(51) Int. Cl.
*B65G 23/44* (2006.01)
*B65H 5/02* (2006.01)

(56) References Cited

U.S. PATENT DOCUMENTS

| | | | | |
|---|---|---|---|---|
| 7,517,309 | B2* | 4/2009 | De Matteis | B65H 45/24 493/411 |
| 8,126,361 | B2* | 2/2012 | Nakano | G03G 15/6558 399/121 |
| 8,840,103 | B2* | 9/2014 | Fukumoto | B65H 3/0684 271/10.04 |
| 8,896,891 | B2* | 11/2014 | Heishi | B65H 3/0684 271/134 |
| 9,164,461 | B2* | 10/2015 | Taira | G03G 15/1615 |
| 10,059,544 | B2* | 8/2018 | Ito | B41J 11/007 |
| 11,702,306 | B2* | 7/2023 | Nakajima | G03G 15/1615 271/275 |
| 12,116,226 | B2* | 10/2024 | Koch | B41F 23/0483 |
| 2015/0075207 | A1* | 3/2015 | Karikusa | G03G 15/6573 62/380 |
| 2019/0202215 | A1 | 7/2019 | Asada et al. | |
| 2019/0204767 | A1 | 7/2019 | Ishihara et al. | |
| 2020/0290383 | A1 | 9/2020 | Ishihara et al. | |
| 2022/0073295 | A1 | 3/2022 | Ishihara et al. | |

FOREIGN PATENT DOCUMENTS

| | | |
|---|---|---|
| JP | 2000-172086 | 6/2000 |
| JP | 2005-345940 | 12/2005 |
| JP | 2006-151697 | 6/2006 |
| JP | 2010-055128 | 3/2010 |
| JP | 2015-169918 | 9/2015 |
| JP | 2015-194610 | 11/2015 |
| JP | 2018-013503 | 1/2018 |

* cited by examiner

CONVEYANCE DIRECTION

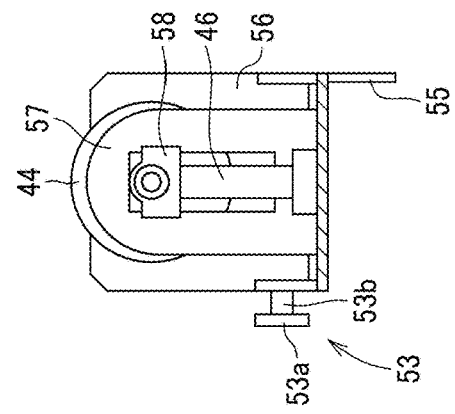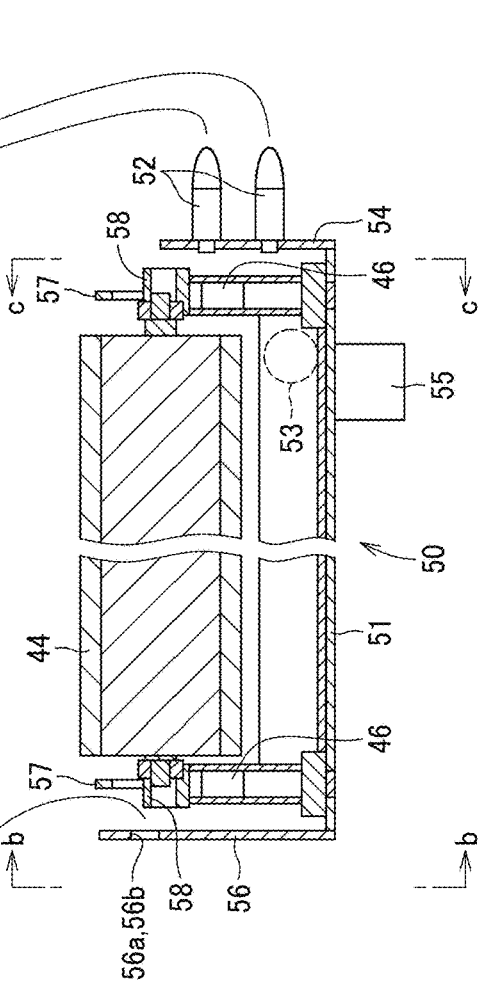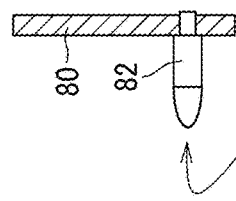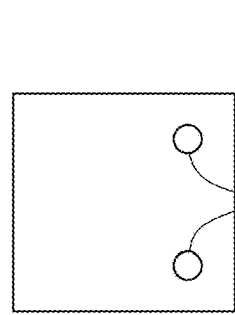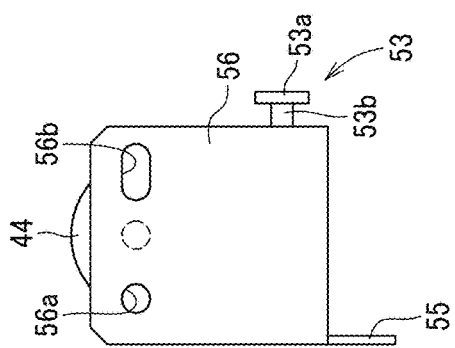

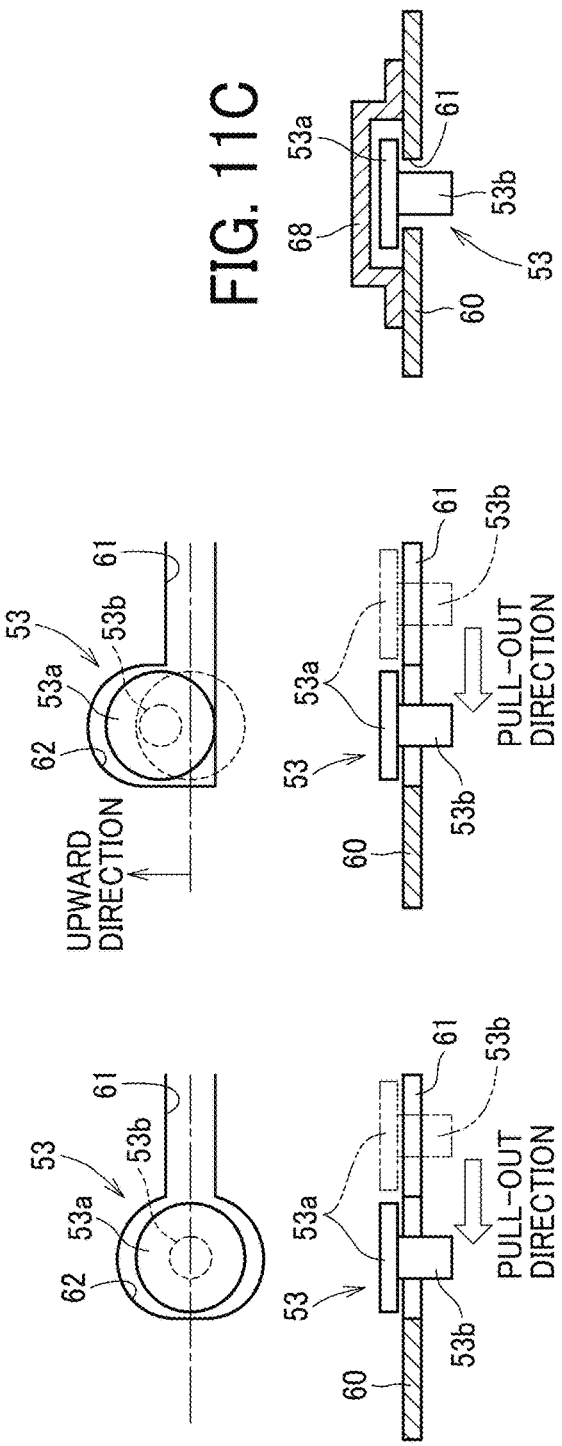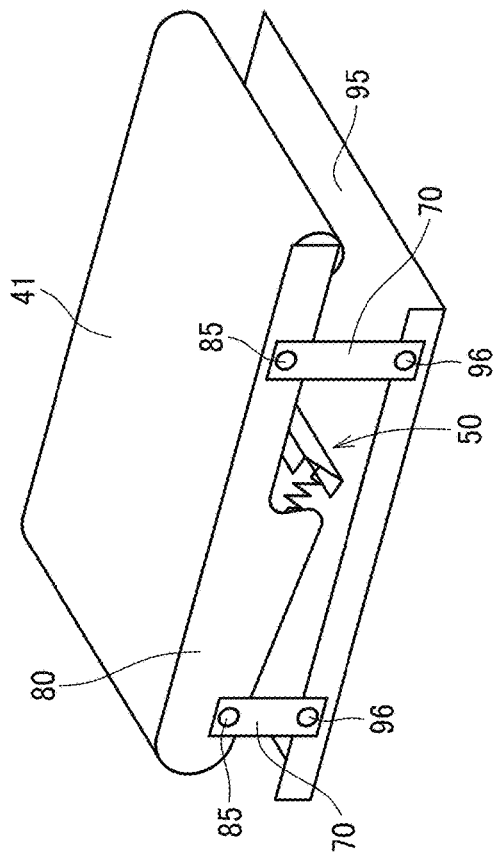

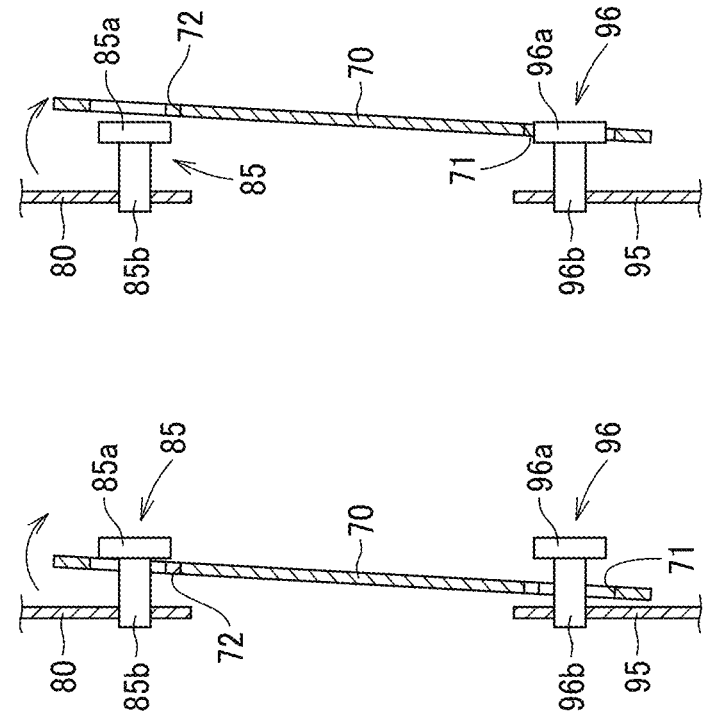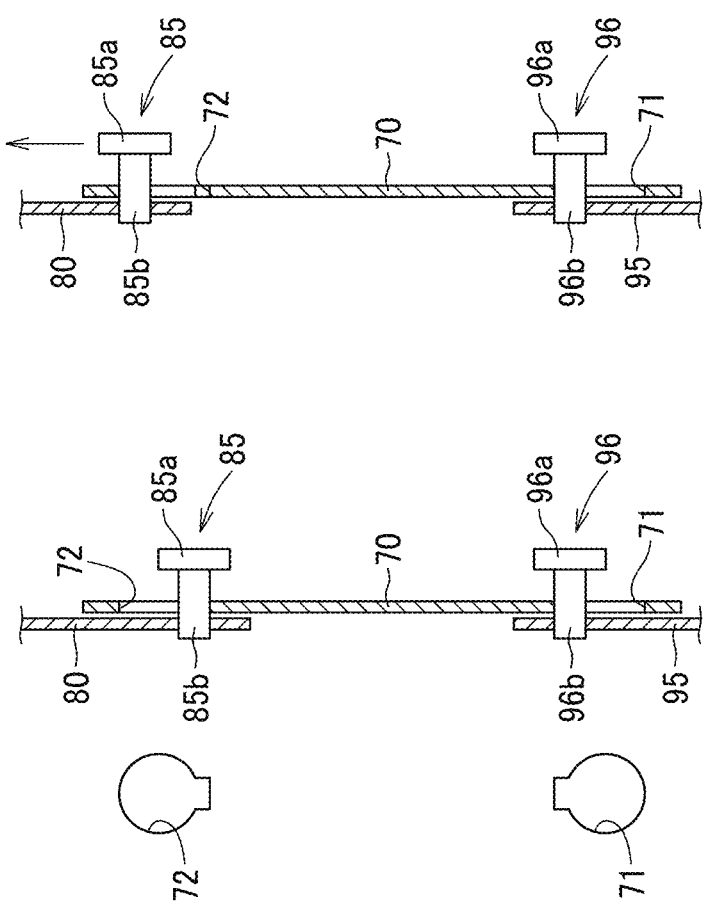

DEVICE FOR ATTACHING AND DETACHING ROLLER, AND BELT CONVEYOR INCLUDING THE DEVICE

CROSS-REFERENCE TO RELATED APPLICATION

This patent application is based on and claims priority pursuant to 35 U.S.C. § 119(a) to Japanese Patent Application No. 2022-047027, filed on Mar. 23, 2022, in the Japan Patent Office, the entire disclosure of which is hereby incorporated by reference herein.

BACKGROUND

Technical Field

Embodiments of the present disclosure relate to a device for attaching and detaching a roller, and a belt conveyor including the device, and more particularly to a roller attachment-and-detachment device including a guide to facilitate attachment and detachment of a roller supporting a belt, and a belt conveyor including the device.

Related Art

Currently, electrophotographic systems and inkjet systems have become widespread even in large-sized printers, for example, in response to the demand for multi-product low-volume production of printed materials. Such a large-sized printer typically includes a large-sized belt conveyor to convey printed materials. Belts employed in such a large-sized belt conveyor are removed from the large-sized belt conveyor when a timing for periodic replacement and cleaning arrives.

SUMMARY

In an embodiment of the present disclosure, a device attaches and detaches, as a detachable roller, at least one of a plurality of rollers in a belt conveyor in which an endless belt is wound around the plurality of rollers arranged between a front plate and a rear plate of the belt conveyor. The at least one of the plurality of rollers is attached to and detached from the belt conveyor from a front side of the device at which the front plate is disposed in the belt conveyor. The device includes a guide and a roller holder. The guide has a base end to be supported by the rear plate on a rear side of the device. The guide extends along a longitudinal direction of the detachable roller from the rear side to the front side when the base end is supported by the rear plate. The guide includes a guide groove extending in the longitudinal direction of the detachable roller. The roller holder holds the detachable roller and includes an engagement portion, another engagement portion, and a guided portion. The engagement portion detachably engages with the front plate. The other engagement portion detachably engages with the rear plate. The guided portion slides along the guide groove of the guide toward the rear side or the front side of the device to engage or disengage the engagement portion with or from the front plate and engage or disengage the other engagement portion with or from the rear plate.

In another embodiment of the present disclosure, a belt conveyor includes the above-described device. The rear plate is disposed on a rear face of a housing of the belt conveyor and connected to a bottom plate of the belt conveyor. A front end of the bottom plate on the front side of the device is connected to the front plate by a plurality of detachable supports.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5BA is a front view, FIG. 5BB is a left side view, and FIG. 5BC is a right-side view of a lower belt-conveyor unit according to an embodiment of the present disclosure

FIGS. 11A, 11B, and 11C are diagrams illustrating a guide according to a modification of the present disclosure;

FIG. 12 is a perspective view of a support structure of a lower belt-conveyor unit, according to an embodiment of the present disclosure; and FIGS. 13A, 13B, 13C, and 13D are cross-sectional views of a lower belt-conveyor unit in which a support is detached from the lower belt-conveyor unit, according to an embodiment of the present disclosure.

Figure 1:
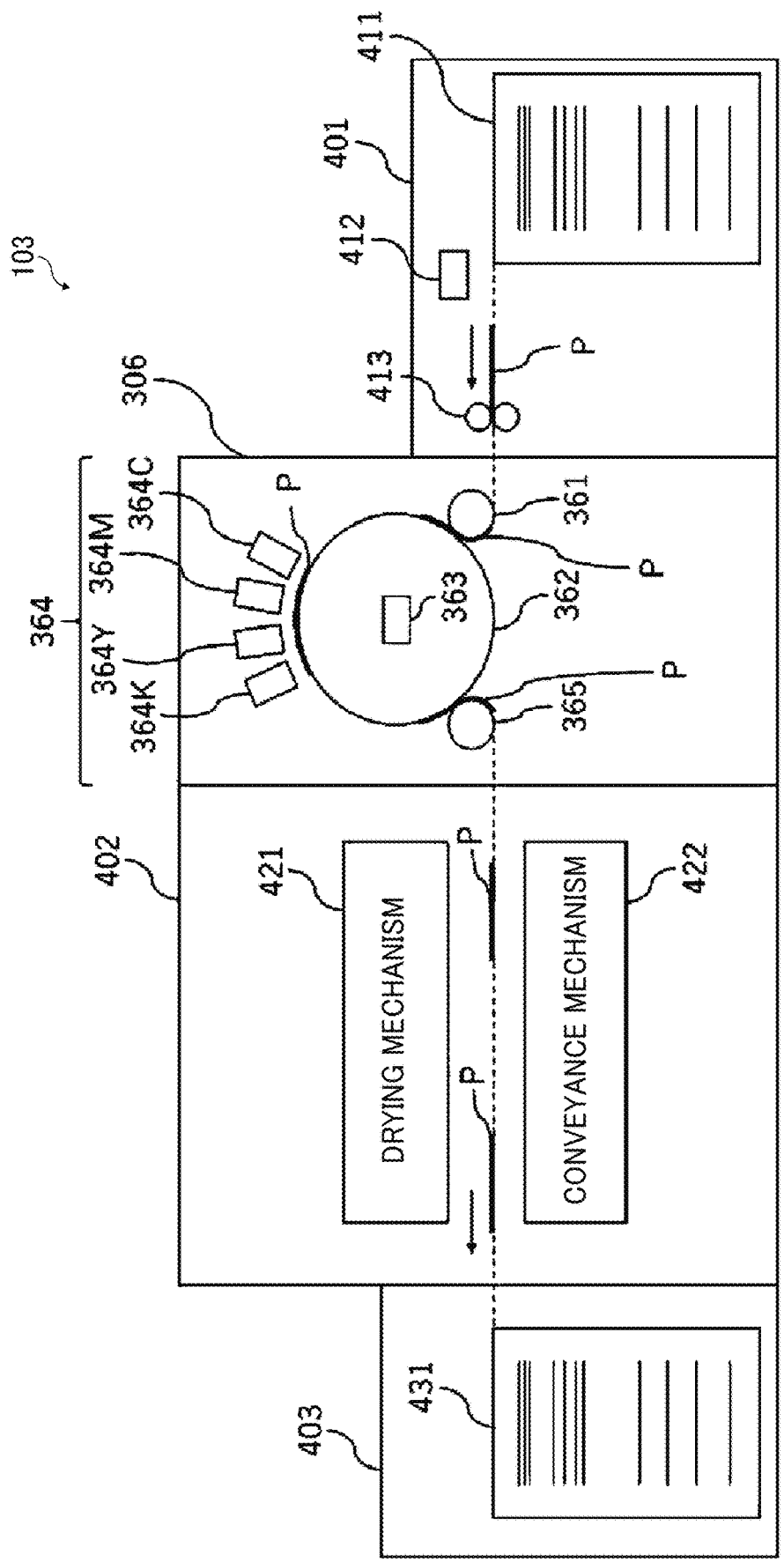
FIG. 1 is a diagram illustrating a schematic configuration of an image forming apparatus including a belt conveyor, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Overall Description of Image Forming Apparatus

Embodiments of the present disclosure are described in detail below with reference to the drawings. FIG. 1 is a diagram illustrating a schematic configuration of an image forming apparatus 103 including a belt conveyor, according to an embodiment of the present disclosure.

The image forming apparatus 103 is, for example, an inkjet-type image forming apparatus. The image forming apparatus 103 typically includes a sheet feeder 401, an image former 306, a drier 402, and a sheet ejector 403.

In the image forming apparatus 103, a sheet P, which is a recording material as a sheet material, is fed from the sheet feeder 401. Then, an image former 306 forms an image on a sheet P using ink which is liquid for image formation. After the ink that has adhered to the sheet P is dried in the drier 402, the sheet P is ejected from the sheet ejector 403.

Sheet Feeder

The sheet feeder 401 typically includes a sheet tray 411 on which multiple sheets P are stacked, a sheet feeding device 412 that separates and feeds the sheets P one by one from the sheet tray 411, and a registration roller pair 413 that feeds the sheet P to the image former 306. Any sheet feeding device such as a device using a roller or a device using air suction may be employed as the sheet feeding device 412.

After the leading end of a sheet P that has been fed from the sheet tray 411 by the sheet feeding device 412 reaches the registration roller pair 413, the registration roller pair 413 is driven at a predetermined timing to feed the sheet P to the image former 306. Note that, in embodiments of the present disclosure, the configuration of the sheet feeder 401 is not limited to the above-described configuration as long as the sheet feeder 401 feeds a sheet P to the image former 306.

Image Former

The image former 306 typically includes a receiving drum 361 to receive a fed sheet P, a sheet bearing drum 362 to convey the sheet P borne by the receiving drum 361 on an outer peripheral surface of the sheet bearing drum 362, an ink discharger 364 to discharge ink toward the sheet P borne by the sheet bearing drum 362, and a transfer drum 365 to deliver the sheet P borne by the sheet bearing drum 362 to the drier 402.

The leading end of the sheet P that has been conveyed from the sheet feeder 401 to the image former 306 is gripped by a sheet gripper disposed on the surface of the receiving drum 361, and the sheet P is conveyed as the surface of the receiving drum 361 moves. The sheet P that has been conveyed by the receiving drum 361 is delivered to the sheet bearing drum 362 at a position facing the sheet bearing drum 362.

A sheet gripper is also disposed on the surface of the sheet bearing drum 362, and the leading end of the sheet P is gripped by the sheet gripper. Multiple suction holes are dispersedly formed on the surface of the sheet bearing drum 362.

In each of the suction holes, a suction airflow directed toward the inside of the sheet bearing drum 362 is generated by the suction device 363. The leading end of the sheet P that has been delivered from the receiving drum 361 to the sheet bearing drum 362 is gripped by the sheet gripper, and the sheet P is attracted onto the surface of the sheet bearing drum 362 by the suction air flows and is conveyed as the surface of the sheet bearing drum 362 moves.

The ink discharger 364 according to the present embodiment forms an image by discharging ink of four colors of C (cyan), M (magenta), Y (yellow), and K (black). The ink discharger 364 includes individual liquid discharge heads 364C, 364M, 364Y, and 364K for respective colors of ink.

The configuration of the liquid discharge heads 364C, 364M, 364Y, and 364K is not limited to any particular configuration. The liquid discharge heads 364C, 364M, 364Y, and 364K can adopt any configuration as long as the liquid discharge head discharges liquid. The ink discharger 301 may include, for example, liquid discharge heads to discharge special ink, such as ink of white, gold, and silver, or a liquid discharge head to discharge liquid that does not form an image, such as a surface coating liquid, as needed.

Discharge operations of the liquid discharge heads 364C, 364M, 364Y, and 364K of the ink discharger 364 are controlled by drive signals corresponding to image data. When a sheet P borne on the sheet bearing drum 362 passes through a region facing the ink discharger 364, the color inks are discharged from the liquid discharge heads 364C, 364M, 364Y, and 364K to form an image corresponding to the image data. In the present embodiment, the configuration of the image former 306 is not limited to any particular configuration as long as the image former 306 attaches liquid onto the sheet P to form an image.

Drier

The drier 402 typically includes a drying mechanism 421 to dry the ink adhered on a sheet P in the image former 306, and a conveyance mechanism 422 to convey the sheet P conveyed from the image former 306 by a belt conveyor. The sheet P that has been conveyed from the image former 306 is received by the conveyance mechanism 422. Then, the sheet P is conveyed to pass through the drying mechanism 421 and is delivered to the sheet ejector 403. When the sheet P passes through the drying mechanism 421, the ink on the sheet P is subjected to a drying process, by which liquid component such as moisture in the ink is evaporated. Accordingly, the ink is fixed onto the sheet P, and curling of the sheet P is reduced.

Sheet Ejector

The sheet ejector 403 typically includes an output tray 431 on which multiple sheets P are stacked. Each of the sheets P conveyed from the drier 402 is sequentially stacked and held on the output tray 431. In the present embodiment, the configuration of the sheet ejector 403 is not limited to any particular configuration as long as the sheet ejector 403 ejects a sheet P.

Image Former and Other Functional Units

The image forming apparatus 103 according to the present embodiment includes the sheet feeder 401, the image former 306, the drier 402, and the sheet ejector 403. Other functional units can be added to the image forming apparatus 103 as appropriate. For example, a pretreatment device that performs pretreatment of image formation may be added between the sheet feeder 401 and the image former 306, and a post-processing device that performs post-processing of the image formation may be added between the drier 402 and the sheet ejector 403.

An example of the pretreatment device may perform a treatment liquid application operation to apply treatment liquid, which react with ink, onto a sheet P to reduce bleeding. However, the content of the pretreatment operation is not limited to any particular content. Examples of the post-processing device may include a post-processing device that performs sheet reverse conveyance processing for reversing a sheet P on which an image has been formed by the image former 306 and conveying the sheet P to the image former 306 again to form images on both sides of the sheet P, and a post-processing device that performs processing for binding multiple sheets P on which images have been formed. In addition, examples of the post-processing device may include a correction mechanism to correct sheet deformation, and a cooling mechanism to cool a sheet P. However, the content of the post-processing operation performed by the post-processing device is not limited to any particular content.

Inkjet Recording Apparatus

Figure 2:
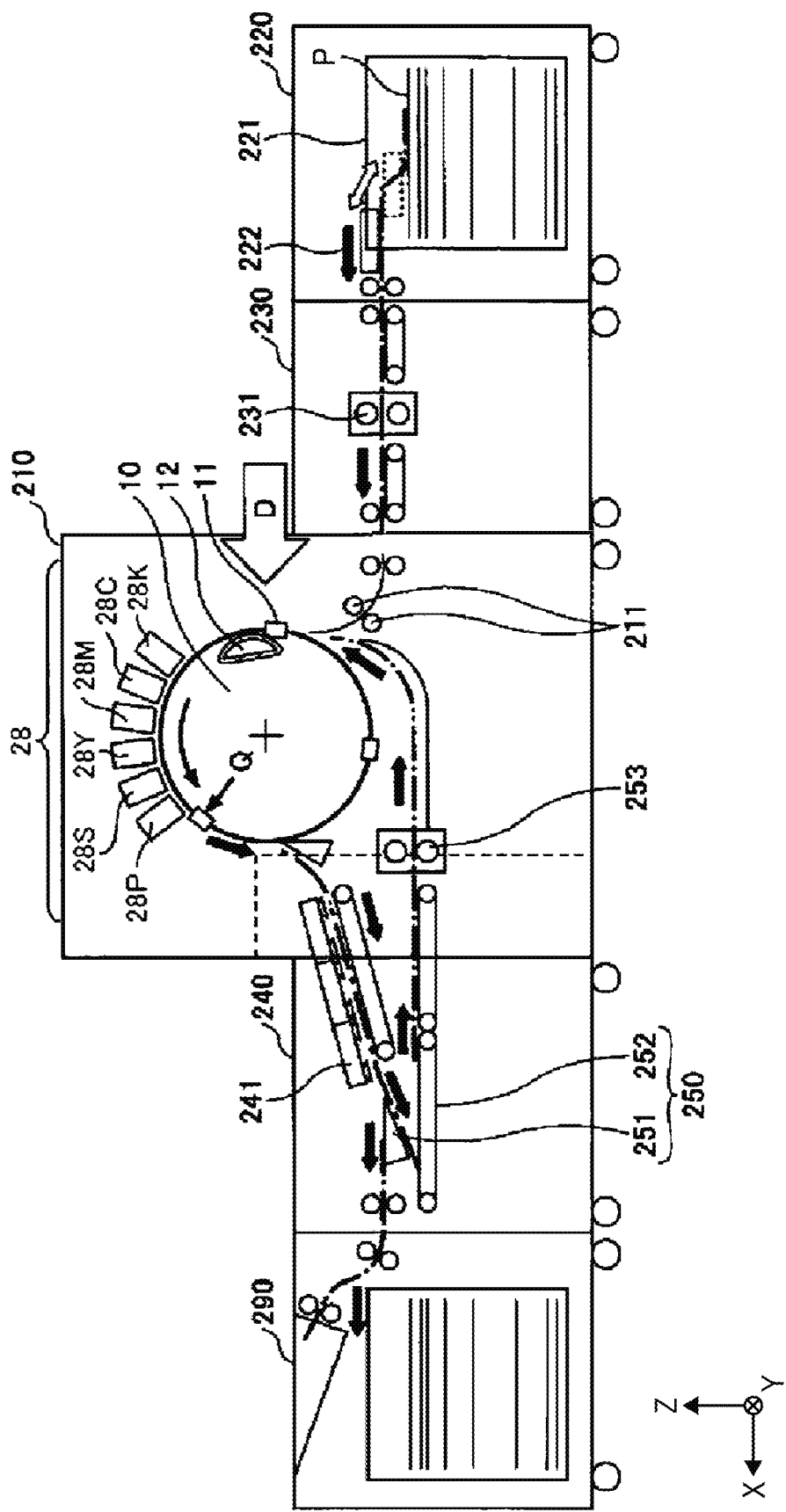
FIG. 2 is a diagram illustrating an inkjet recording apparatus including a belt conveyor, according to an embodiment of the present disclosure.

FIG. 2 is a diagram illustrating an overall configuration of an on-demand line-scan type inkjet recording apparatus including a belt conveyor, according to the present embodiment. The inkjet recording apparatus includes an image former 210, a sheet feeder 220, a registration adjuster 230, a drier 240, a sheet reverse device 250, and a sheet ejector 290.

An example of a procedure during printing is described below. First, sheets P stacked on a sheet stacker 221 of the sheet feeder 220 are picked up one by one by an air separator 222 and conveyed toward the image former 210 in a direction indicated by arrow X in FIG. 2. When the sheet P conveyed from the sheet feeder 220 reaches the registration adjuster 230, the skew of the sheet P is corrected by a registration roller pair 231 disposed inside the registration adjuster 230.

The sheet P whose registration has been adjusted is sent to the image former 210 by a feed roller pair 211. A cylindrical drum 10 rotates while the leading end of the sheet P is nipped by a sheet gripper 11 disposed on the cylindrical drum 10. By so doing, the sheet P is conveyed to a position facing the head modules 28K, 28C, 28M, 28Y, 28S, and 28P of the ink discharger 28.

In the image former 210, the head modules 28K, 28C, 28M, 28Y, 28S, and 28P, which are recording head units that discharge ink by an inkjet method, are radially arranged at angles in a state of being filled with predetermined ink colors along the cylindrical drum 10. The multiple head modules 28K, 28C, 28M, 28Y, 28S, and 28P form an image on the sheet P by discharging ink as liquid from the outside of the circumference of the drum 10 to the outer circumferential surface of the sheet P held on the surface of the drum 10.

A dummy discharge receiver 12 is disposed inside the outer circumferential surface of the cylindrical drum 10. The dummy discharge receiver 12 receives ink discharged as dummy discharge when the head modules 28K, 28C, 28M, 28Y, 28S, and 28P do not discharge ink to the sheet P. After the image has been formed on the sheet P, the sheet P is sent to the drier 240.

Drier units 241 are installed in the drier 240. When the sheet P passes under the drier units 241, moisture of the sheet P is evaporated. A belt conveyor to convey the sheet P is disposed below the drier units 241.

In addition, the drier 240 includes the sheet reverse device 250 including a sheet reverse mechanism 251. A sheet P is reversed in the sheet reverse mechanism 251 when duplex printing is performed. The reversed sheet P is conveyed again toward the image former 210 by a reverse conveyance device 252. The sheet reverse mechanism 251 also includes a belt conveyor.

Before the sheet P reaches the drum 10, the skew of the sheet P is corrected by a registration roller pair 253 disposed inside the image former 210. The sheets P that have been dried by the drier 240 are conveyed to the sheet ejector 290, and the sheets P are stacked in a state in which the trailing ends of the sheets P are aligned.

Figure 3:
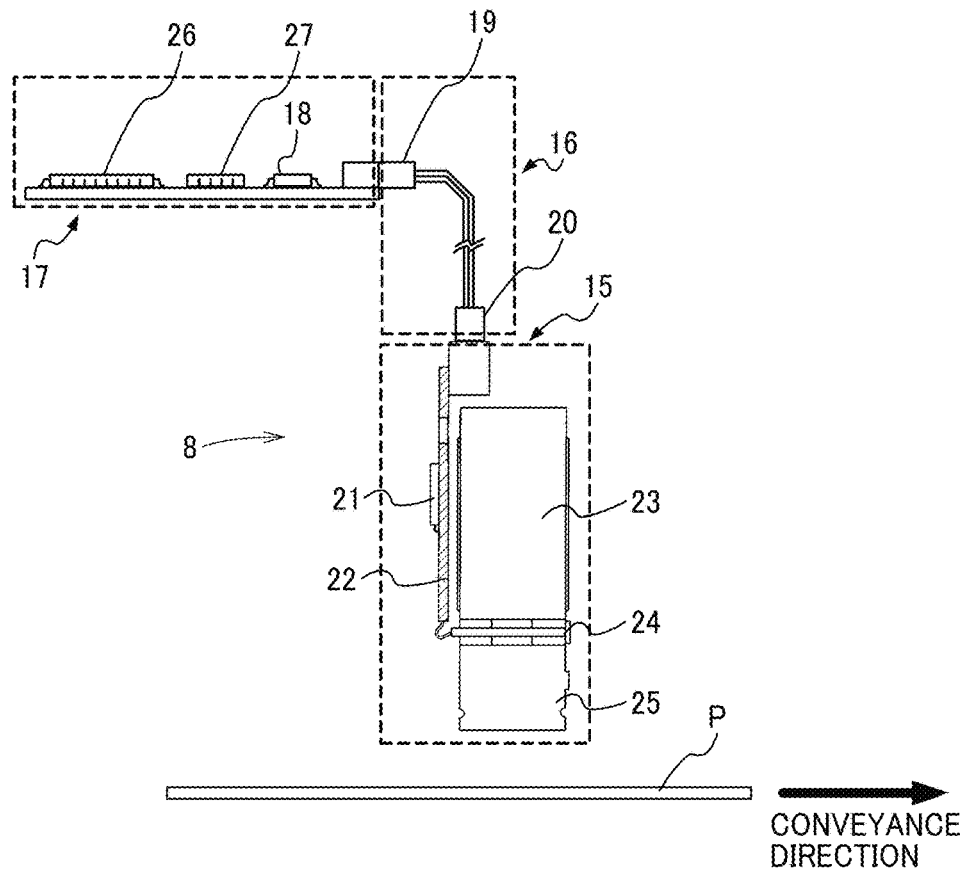
FIG. 3 is a side view of a head module of the inkjet recording apparatus of FIG. 2.

FIG. 3 is a side view of an inkjet recording head module 8 according to an embodiment of the present disclosure. The inkjet recording head module 8 typically includes a drive control board 17, a recording head 15, and a cable 16.

A drive controller 26, a drive waveform generator 27, and a storage device 18 are mounted on the drive control board 17. A drive control board connector 19 and a head side connector 20 are attached to the cable 16. The cable 16 communicates analog signals and digital signals between the drive control board 17 and a head board 22 mounted on the recording head 15.

The recording head 15 typically includes a residual vibration sensor module 21, the head board 22, a head drive integrated circuit (IC) board 24, an in-head ink tank 23, and a rigid plate 25. In the line-scan type inkjet recording apparatus, the recording head 15 has a line-head configuration in which the multiple recording heads 15 are arranged in a depth (rear or front) direction with respect to the sheet surface of FIG. 3, which is perpendicular to the conveyance direction of the sheet P.

One or multiple recording heads 15 may be employed for a serial-scanning type printer or another type of liquid droplet discharge apparatus in which the one or the multiple recording heads 15 are moved in the depth (or front) direction with respect to the sheet surface of FIG. 3, which is perpendicular to the conveyance direction of the sheet P while the sheet P is moved in the conveyance direction, to form an image.

Belt Conveyor

Figure 4A:
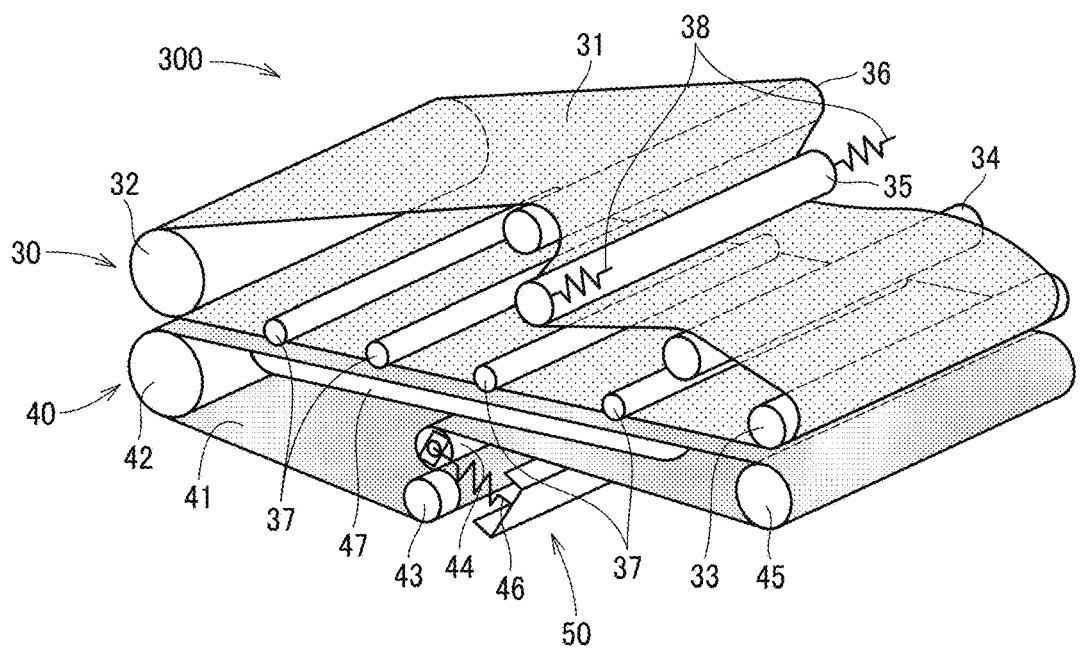
FIG. 4A is a perspective view of a belt conveyor to convey and cool a sheet, according to an embodiment of the present disclosure.

FIG. 4A is a perspective view of a belt conveyor 300 according to the present embodiment. The belt conveyor 300 includes an upper belt-conveyor unit 30 and a lower belt-conveyor unit 40. The belt conveyor 300 can convey a sheet P as a conveyed medium while nipping the sheet P between the upper belt-conveyor unit 30 and the lower belt-conveyor unit 40.

Figure 4B:
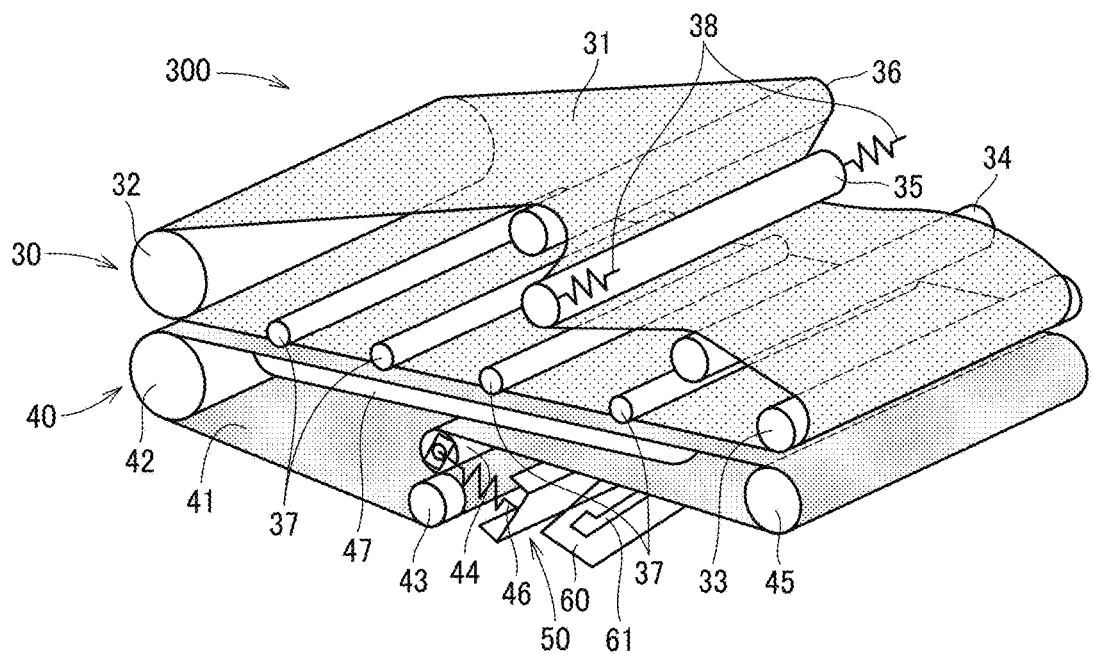
FIG. 4B is a perspective view of a belt conveyor to convey and cool a sheet, according to an embodiment of the present disclosure.
Figure 4C:
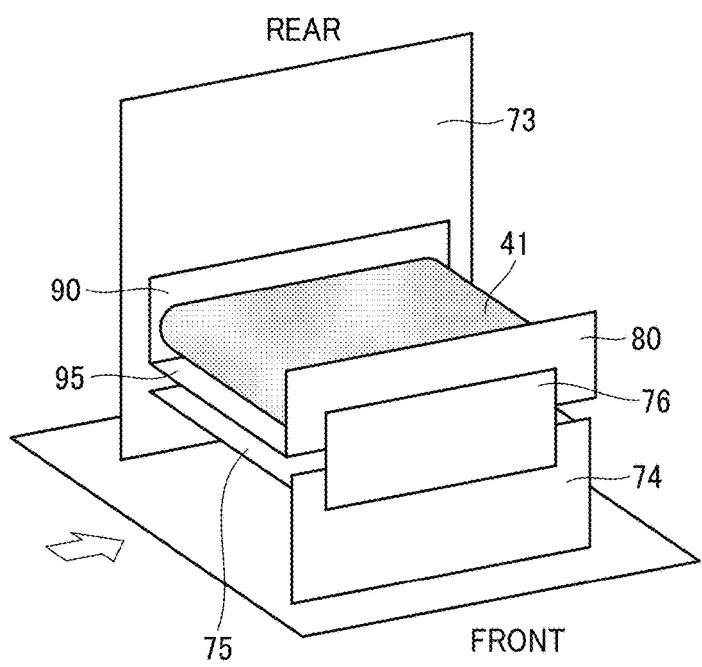
FIG. 4C is a perspective view of an upper-belt-conveyor unit, according to an embodiment of the present disclosure.
Figure 4D:
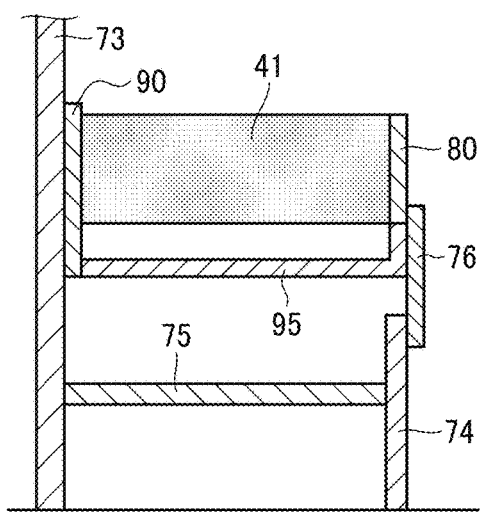
FIG. 4D is a front view of the upper-belt-conveyor unit of FIG. 4C.

The rear side of the lower belt-conveyor unit 40, which is the rear side of the plane on which FIG. 4C is illustrated, is supported by a rear face 73 of the housing of the belt conveyor illustrated in FIG. 4C. The rear side of the upper belt-conveyor unit 30, which is the rear side of the plane on which FIG. 4C is drawn, is fixed to a rear plate 90 supporting the rear side of the lower belt-conveyor unit 40. The front side of the lower belt-conveyor unit 40, which is the front side of the plane on which FIG. 4C is drawn, is supported by a front plate 80 illustrated in FIG. 4C.

The front plate 80 can be supported by a front face 74 of the housing via a holder 76 of FIG. 4C. As another support structure of the front plate 80, a pair of left and right supports 70 described below with reference to FIG. 12 may also be employed. The front side of the upper belt-conveyor unit 30, which is the front side of the plane on which FIG. 4C is drawn, can be supported by another front plate disposed above the front plate 80.

The upper belt-conveyor unit 30 includes an upper belt 31 which is an endless belt. The upper belt 31 is wound around and supported by multiple rollers 32, 33, 34, 35, 36, and 37. The roller 33 on the right side of the upper belt-conveyor unit 30 serves as an entrance-side roller, and the roller 32 disposed on the left side of the upper belt-conveyor unit 30 serves as an exit-side roller.

A compression spring 38 that serves as a biasing member is connected to each of both ends of the tension roller 35 disposed between the roller 34 and roller 36. The tension roller 35 is biased leftward in FIG. 4B by the compression springs 38 to apply belt tension to the upper belt 31. The tension roller 35 is a roller detachable for replacement and inspection of the upper belt 31.

The lower belt-conveyor unit 40 includes a lower belt 41 as an endless belt. The lower belt 41 is wound around and supported by multiple rollers 42, 43, 44, and 45. The roller 45 on the right side of the lower belt-conveyor unit 40 serves as an entrance-side roller, and the roller 42 disposed on the left side of the lower belt-conveyor unit 40 serves as an exit-side roller.

A compression spring 46 as a biasing member is connected to each of both ends of the roller 44 disposed between the rollers 43 and 45. The compression springs 46 bias the roller 44 leftward in FIG. 4B to apply tension to the lower belt 41 as belt tension. The roller 44 is a detachable roller for replacement and inspection of the lower belt 41.

The roller 44 that applies tension to the lower belt 41 is held by a roller holder 50. Details of the roller holder 50 is described below with reference to FIGS. 5AA, 5AB, 5AC, 5BA, 5BB, and 5BC.

When the lower belt 41 of the lower belt-conveyor unit 40 is replaced or inspected, the roller 44 that applies tension to the lower belt 41 is detached. The roller 44 is accessed and detached from a side in which the front plate 80 is disposed on the front side of the belt conveyor in FIG. 4C.

Typically, the roller 44 disposed below the upper belt-conveyor unit 30 is not easily accessed from the side on which the front plate 80 is disposed because the upper belt-conveyor unit 30 acts as an obstacle. For this reason, typically, detaching components which are not necessary to be removed enables access to the roller 44 from the side on which the front plate 80 is disposed.

Accordingly, in the present embodiment, a guide 60 is disposed as illustrated in FIG. 4B. Sliding the roller holder 50 in the front-rear direction along a guide groove 61 of the guide 60 allows the roller holder 50 to be easily attached to and detached from the front plate 80 and the rear plate 90.

Roller Holder

Figure 5A:
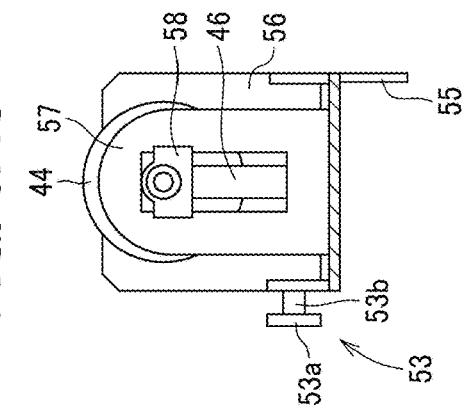
FIG. 5AA is a front view, FIG. 5AB is a left-side view, and FIG. 5AC is a right-side view of a lower belt-conveyor unit according to an embodiment of the present disclosure.
Figure 5A:
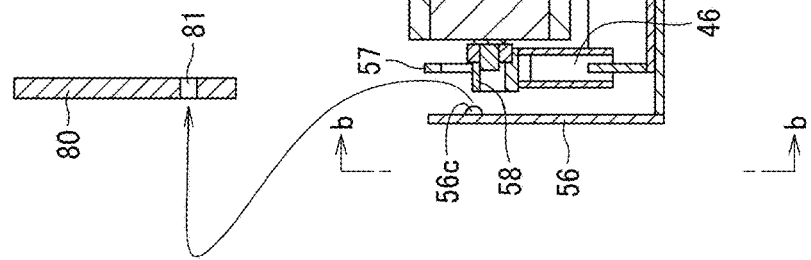
Figure 5A:
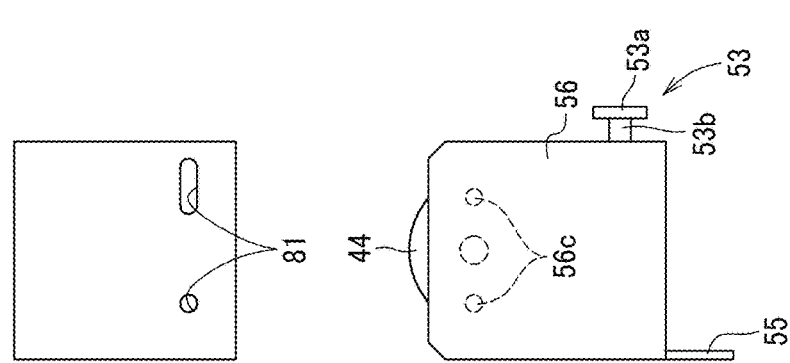

The roller holder 50 includes a base 51 extending in parallel with the roller 44, as illustrated in detail in FIG. 5AB. Both ends of the base 51, i.e., a front end of the base 51 and a rear end of the base 51 form L-shaped side plates 54 and 56, respectively, perpendicular to the base 51.

A pair of positioning pins 52 that extend in the axial direction of the roller 44 project from an outer surface of the side plate 54 on the rear side of the roller holder 50. Each of the pair of positioning pins 52 as engagement portions is fitted into corresponding one of a pair of positioning holes 91 of the rear plate 90.

On the other hand, a pair of positioning protrusions 56c are formed on an inner surface of the side plate 56 on the front side of the roller holder 50. Each of the pair of positioning protrusions 56c as engagement portions is fitted into corresponding one of a pair of positioning holes 81 of the front plate 80. One of the positioning holes 81 of the front plate 80 is formed to be horizontally long such that the corresponding one of the positioning protrusions 56c can be easily fitted into the positioning hole 81.

Each of a pair of support plates 57 that supports corresponding one of bearings 58 of the roller 44 is erected on the base 51 such that the bearings 58 are vertically movable. Shaft portions of the roller 44 are rotatably supported by the bearings 58. The bearings 58 are biased upward by the compression springs 46 in FIG. 5AB.

A guided portion 53 is disposed on a side surface of the base 51 in the vicinity of the positioning pins 52. The guided portion 53 includes a flange portion 53a and a shaft portion 53b. The shaft portion 53b is fixed to the side surface of the base 51 at a right angle to a direction in which the compression springs 46 are biased. The center of the flange portion 53a is fixed to the tip end of the shaft portion 53b.

A contact portion 55 protrudes from a lower surface of the base 51 in the vicinity of the guided portion 53. The contact portion 55 slides along an auxiliary guide 69 to stabilize the posture of the roller holder 50, as described below with reference to FIG. 9.

In FIGS. 5BA, 5BB, and 5BC, the structure in which the roller holder 50 is engaged with respect to the front plate 80 is changed from the structure illustrated in FIGS. 5AA, 5AB, and 5AC. In other words, a pair of positioning holes 56a and 56b are formed on the side plate 56 on the front side of the roller holder 50 as illustrated in FIG. 5BA.

Each of the pair of positioning pins 82 of the front plate 80 is fitted into corresponding one of the pair of positioning holes 56a and 56b. The positioning hole 56b is formed to be horizontally long such that the corresponding one of the positioning pins 82 can be easily fitted in the positioning hole 56b. Other components of the roller holder 50 are similar to, even if not the same as, the components illustrated in FIGS. 5AA, 5AB, and 5AC.

Guided Portion

Figure 6A:
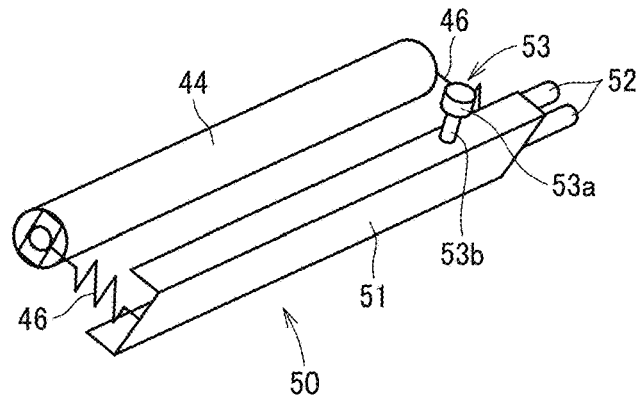
FIG. 6A is a perspective view of a tension roller and a roller holder according to an embodiment of the present disclosure.

The roller 44 as a detachable roller is supported by the roller holder 50 via the pair of compression springs 46 as illustrated in FIG. 6A. The positioning pins 52 and the guided portion 53 are disposed at the rear end of the roller holder 50.

The roller holder 50 can be pulled out to the front side of the belt conveyor while the roller 44 is held as illustrated in FIG. 4B. The guide 60 in FIG. 6B facilitates the roller holder 50 to be pulled out.

Guide

A sheet metal is formed into a strip shape to form the guide 60. The guide 60 is disposed along the longitudinal direction of the roller 44. A base end, which is a rear side of the sheet surface of FIG. 4C, of the guide 60 is fixed to the rear plate 90 in FIG. 4C. A front end of the guide 60, which is an end of the guide 60 on a front side of the plane on which FIG. 4C is drawn, extends toward the front plate 80 in FIG. 4C. The guide 60 is a main component of a device for attaching and detaching a roller (hereinafter, a roller attachment-and-detachment device) according to the present embodiment. The guide 60 can also be employed to attach and detach the rollers of the belt conveyor of FIGS. 1 and 2.

The guide 60 extends horizontally from the rear plate 90 toward the front plate 80, preferably in such a manner that the guide 60 is inclined downward to the right when viewed from the front side. The magnitude, i.e., angle in which the guide 60 is inclined downward to the right is determined by the posture of the roller holder 50 in which the roller holder 50 is mounted with respect to the front plate 80 and the rear plate 90.

When the roller holder 50 is installed in the lower belt-conveyor unit 40 to bias the roller 44 substantially vertically upward as illustrated in FIGS. 4A and 4B, the guide 60 can be disposed substantially vertically when viewed from the front side of the belt conveyor 300. On the other hand, when the roller holder 50 is installed in the lower belt-conveyor unit 40 to bias the roller 44 upward to the left, which is substantially horizontal in FIGS. 4A and the 4B, the guide 60 can be disposed to be inclined downward to the right at an angle of about 10 to 30° when viewed from the front side of the belt conveyor 300.

As described above, disposing the guide 60 such that the guide 60 is inclined downward to the right allows the shaft portion 53b of the guided portion 53 to be guided along one-side edge of the guide groove 61. In other words, the shaft portion 53b of the guided portion 53 can be prevented from rattling in the guide groove 61 when the roller holder 50 is attached and detached.

The guide groove 61 is formed to extend from the base end to the front end of the guide 60. The guide groove 61 guides the guided portion 53 when the roller holder 50 is pulled out to the front side of the belt conveyor 300.

Although the guide groove 61 is formed along the longitudinal direction of the roller 44, the guide groove 61 is not a single linear shape as a whole but includes a first linear portion 63, a second linear portion 67, and an inclined portion 65 as described below. The guide groove 61 functions as a cam groove.

Figure 6B:
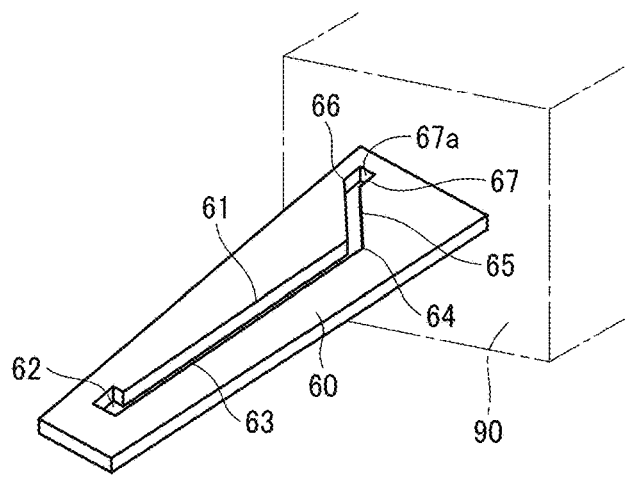
FIG. 6B is a perspective view of a guide of a roller attachment-and-detachment device, according to an embodiment of the present disclosure.

An entrance-and-exit hole 62 is formed at a front end of the guide groove 61 on the front side of the plane on which FIG. 6B is drawn. The entrance-and-exit hole 62 is formed offset to a side opposite to the one-side edge of the guide groove 61, which guides the shaft portion 53b of the guided portion 53, in a width direction, i.e., short direction of the guide groove 61.

The width of the entrance-and-exit hole 62 is formed to be wider than the groove width of the guide groove 61, and the flange portion 53a of the guided portion 53 can be inserted into and removed from one side of the guide 60 to the other side of the guide 60 through the entrance-and-exit hole 62. The shape of the entrance-and-exit hole 62 may be any shape such as a circular shape or a rectangular shape as long as the flange portion 53a can be inserted and removed through the entrance-and-exit hole 62.

The first linear portion 63, a first bent portion 64, an inclined portion 65, a second bent portion 66, and the second linear portion 67 are formed in succession to the entrance-and-exit hole 62. The first linear portion 63 may be parallel to the axial direction of the roller 44 of FIG. 4B. The first linear portion 63 may be formed such that the length of the first linear portion 63 is, for example, about 80% of the entire length of the guide groove 61.

However, the length ratio (%) of the first linear portion 63 can be increased or decreased in accordance with the length of the positioning pin 52 described below. When the length of the positioning pin 52 is increased, the length ratio (%) of the second linear portion 67 is increased. Accordingly, the length ratio (%) of the first linear portion 63 is decreased. On the other hand, when the length of the positioning pin 52 is reduced, the length ratio (%) of the second linear portion 67 is reduced. For this reason, the length ratio (%) of the first linear portion 63 is increased.

The first bent portion 64 is a portion at which the first linear portion 63 changes to the inclined portion 65. When the shaft portion 53b of the guided portion 53 passes through the first bent portion 64, the roller holder 50 is guided in a direction in which the compression springs 46 are compressed by the action of the inclined portion 65.

The second bent portion 66 is a portion at which the inclined portion 65 changes to the second linear portion 67. When the shaft portion 53b of the guided portion 53 passes through the second bent portion 66, the action to further compress the compression springs 46 ceases. Accordingly, the roller holder 50 is guided in the direction in which the positioning pins 52 are inserted into the positioning holes 91 of the rear plate 90.

Roller Mounting Method

Figure 7A:
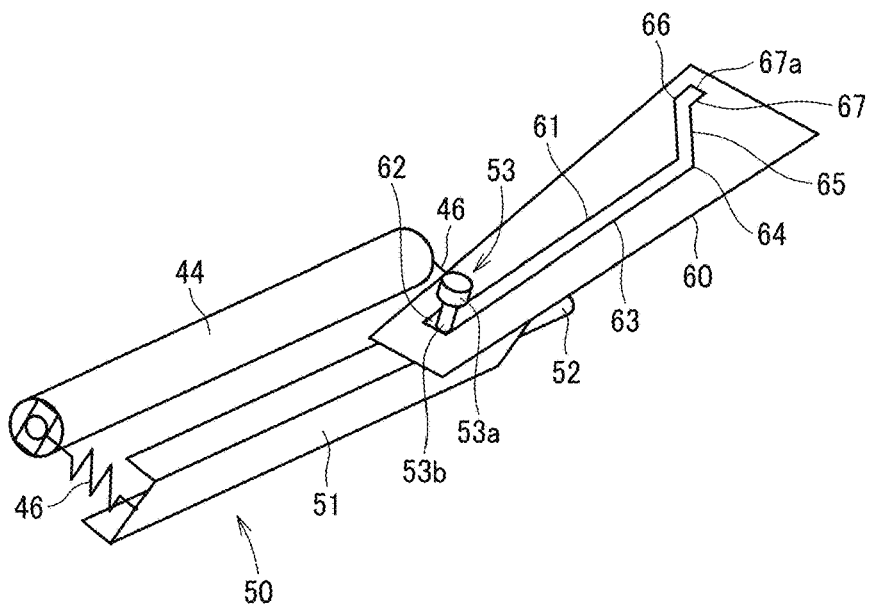
FIGS. 7A, 7B, and 7C are perspective views of the roller holder of FIG. 6A and the guide of FIG. 6B in which the roller holder is attached along the guide stepwise, according to an embodiment of the present disclosure.

When the roller holder 50 is attached from the front side of the belt conveyor 300, i.e., from the side on which the front plate 80 is disposed in FIG. 4C, while the roller holder 50 is horizontally supported by hand, the guided portion 53 at the rear end of the roller holder 50 is inserted into the entrance-and-exit hole 62 from below to above, as illustrated in FIG. 7A. The entrance-and-exit hole 62 has a size through which the flange portion 53a of the guided portion 53 can pass. Accordingly, the guided portion 53 can be easily inserted into the entrance-and-exit hole 62.

When the guided portion 53 is inserted into the entrance-and-exit hole 62, the hand supporting the rear side of the roller holder 50 can be released. In other words, when the hand supporting the rear side of the roller holder 50 is released, the shaft portion 53b of the guided portion 53 moves to one-side edge, which is a right-side edge in FIG. 7A, of the guide groove 61 by the self-weights of the roller 44 and the roller holder 50.

When the shaft portion 53b of the guided portion 53 moves to the one-side edge of the guide groove 61 as described above, the flange portion 53a of the guided portion 53 can no longer fall off the guide groove 61. Accordingly, the operator can remove the hand from the rear side of the roller holder 50 without anxiety.

Figure 7B:
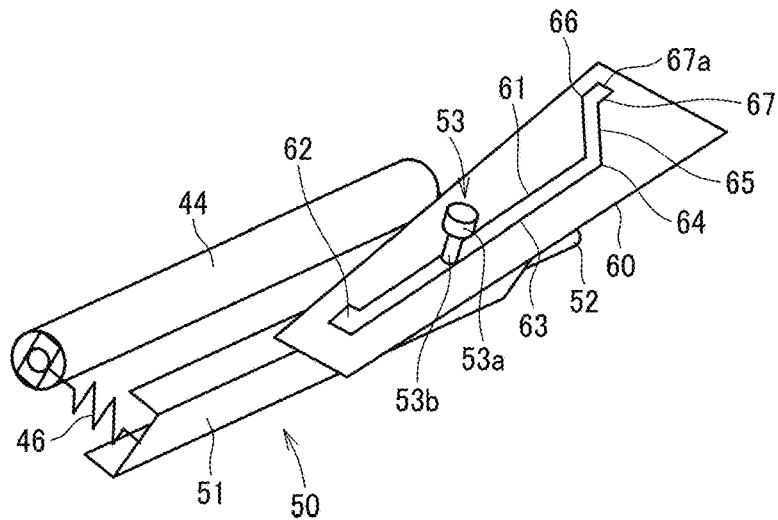

Next, as illustrated in FIG. 7B, the roller holder 50 is pushed toward the rear side of the lower belt-conveyor unit 40 while the front side of the roller holder 50 is supported by the hand. At this time, the shaft portion 53b of the guided portion 53 is guided by the first linear portion 63 of the guide groove 61 and moves to the rear side of the guide groove 61.

Figure 7C:
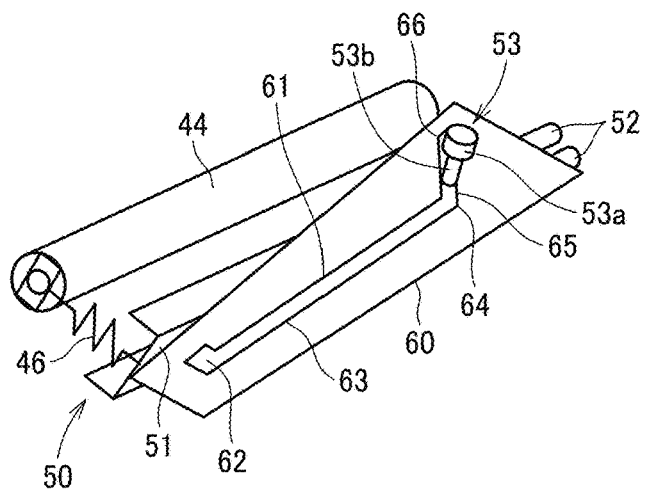
Figure 8A:
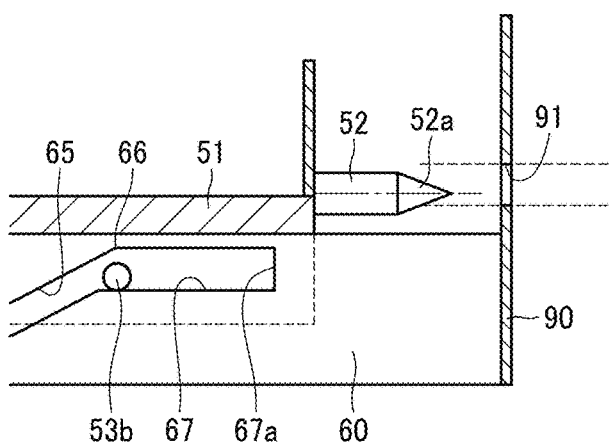
FIG. 8A is a diagram illustrating in which a rear-side positioning pin of the roller holder of FIG. 6A has not been engaged yet with a rear plate, according to an embodiment of the present disclosure.

When the shaft portion 53b of the guided portion 53 moves to a rear side of the inclined portion 65 as illustrated in FIG. 7C, the rear side of the roller holder 50 also moves along the inclined portion 65. At the same time, the compression springs 46 are compressed. When the shaft portion 53b of the guided portion 53 reaches the second bent portion 66, further compression of the compression springs 46 is stopped. At the same time, an extension line of the axis of the positioning pin 52 enters the inside of the positioning hole 91 as illustrated in FIG. 8A.

Figure 8B:
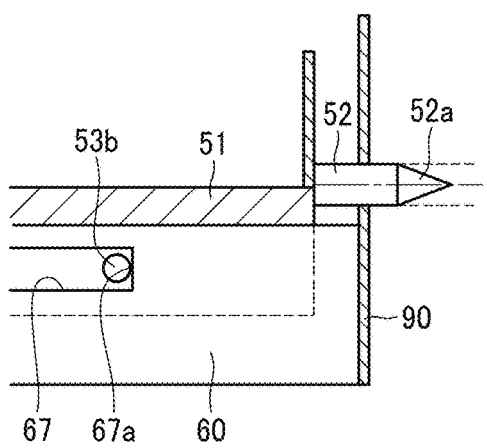
FIG. 8B is a diagram illustrating in which the rear-side positioning pin of the roller holder has been engaged with the rear plate, according to an embodiment of the present disclosure.

When the shaft portion 53b of the guided portion 53 moves along the second linear portion 67 to the rear side of the lower belt-conveyor unit 40, the positioning pin 52 is fitted into the positioning hole 91 of the rear plate 90 as illustrated in FIG. 8B. Such a movement as described above completes the positioning of the rear end of the roller holder 50.

At the same time, each of the positioning protrusions 56c on the front side of the roller holder 50 is fitted into the corresponding one of the positioning holes 81 of the front plate 80 as illustrated in FIGS. 5AA and 5AB. Further, in FIGS. 5BA and 5BB, each of the positioning pins 82 of the front plate 80 is fitted into corresponding one of the positioning holes 56a and 56b on the front side of the roller holder 50.

As described above, the roller holder 50 is positioned at two positions on the front side and the rear side of the roller holder 5. Accordingly, the roller holder 50 and the roller 44 can be accurately positioned without rattling. In addition, components that are employed to position the roller holder 50 are only the guide 60 and the shaft portion 53b of the guided portion 53. Thus, the cost of the conveyor is reduced and the space for the conveyor is saved.

Engagement of Roller Holder with Rear Plate

A tapered portion 52a is formed at a tip end of the positioning pin 52. Accordingly, the positioning pin 52 is fitted into the positioning hole 91 smoothly by the tapered portion 52a, when the positioning pin 52 is fitted into the positioning hole 91 of the rear plate 90 as illustrated in FIGS. 8A and 8B. The shaft portion 53b of the guided portion 53 contacts a terminal end 67a of the second linear portion 67. By so doing, the terminal position to which the roller holder 50 moves toward the rear side of the lower belt-conveyor unit 40 is restricted. Accordingly, the roller holder 50 and the roller 44 can be accurately positioned in the axial direction of the roller holder 50 and the roller 44.

First Modification

Figure 9:
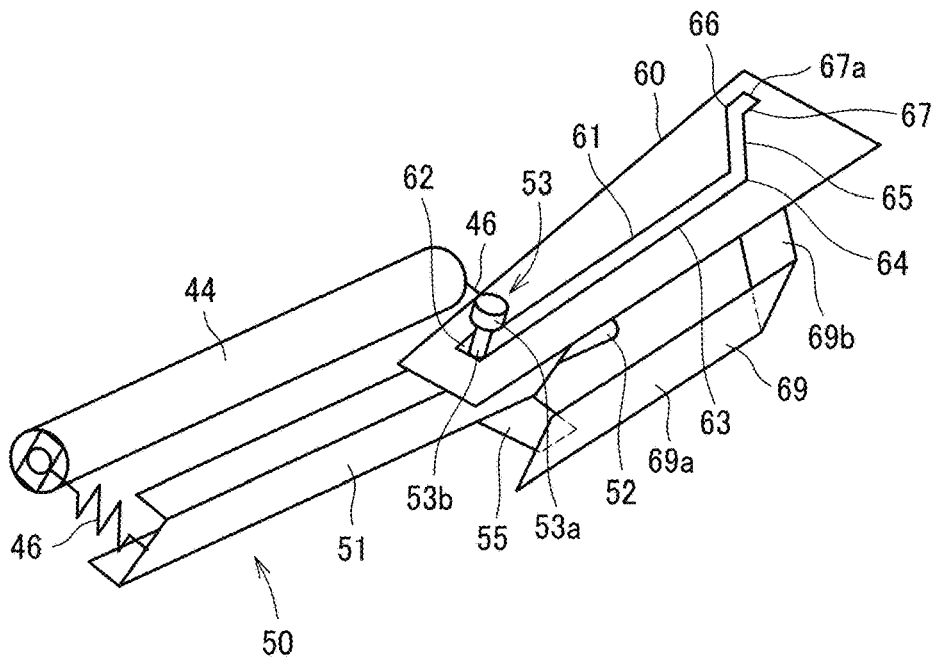
FIG. 9 is a perspective view of a tension roller and a roller holder in which an auxiliary guide is disposed along a guide, according to a modification of the present disclosure.

FIG. 9 illustrates the roller holder 50 according to a first modification of the above-described embodiment of the present disclosure in which the support of the roller holder 50 is stabilized. In the above-described embodiment, the weight of the rear side of the roller holder 50 is supported only by the flange portion 53a of the guided portion 53.

Accordingly, when the roller holder 50 is moved in the front-rear direction as illustrated in FIGS. 7A, 7B, and 7C, the stability of the roller holder 50 in the left-right rotation direction may not be favorable. If the roller holder 50 rattles, when the roller holder 50 moves in the front-rear direction, the roller holder 50 may contact other components around the roller holder 50.

For this reason, in the first modification, the plate-shaped contact portion 55 is disposed on the lower surface of the base 51 at the rear end of the roller holder 50. The contact portion 55 protrudes to a side of the roller holder 50 opposite the compression springs 46.

On the other hand, a plate-shaped auxiliary guide 69 is disposed below the guide 60. In similar to the guide 60, the auxiliary guide 69 includes a base end fixed to the rear plate 90 and a front end extending toward the front plate 80.

A front portion 69a of the auxiliary guide 69 has a flat surface parallel to the first linear portion 63 of the guide groove 61 of the guide 60. A rear portion 69b of the auxiliary guide 69 has a flat surface parallel to the inclined portion 65 of the guide groove 61 of the guide 60.

As illustrated in FIG. 9, in a state in which the contact portion 55 contacts the auxiliary guide 69, the flange portion 53a of the guided portion 53 is inserted into the front end, i.e., the entrance-and-exit hole 62, of the guide groove 61 from below. The position of the flange portion 53a of the guided portion 53 in the left-right direction is determined by the auxiliary guide 69. Accordingly, the guided portion 53 can be easily inserted into the entrance-and-exit hole 62.

The roller holder 50 can be moved in the front-rear direction as illustrated in FIG. 7 from the state of the roller holder 50 of FIG. 9. At this time, the rotation of the roller holder 50 in the left-right direction is restricted by the auxiliary guide 69. Accordingly, a possibility that the roller holder 50 and the roller 44 may contact other components in the vicinity of the roller holder 50 and the roller 44 can be reduced.

Second Modification

Figure 10:
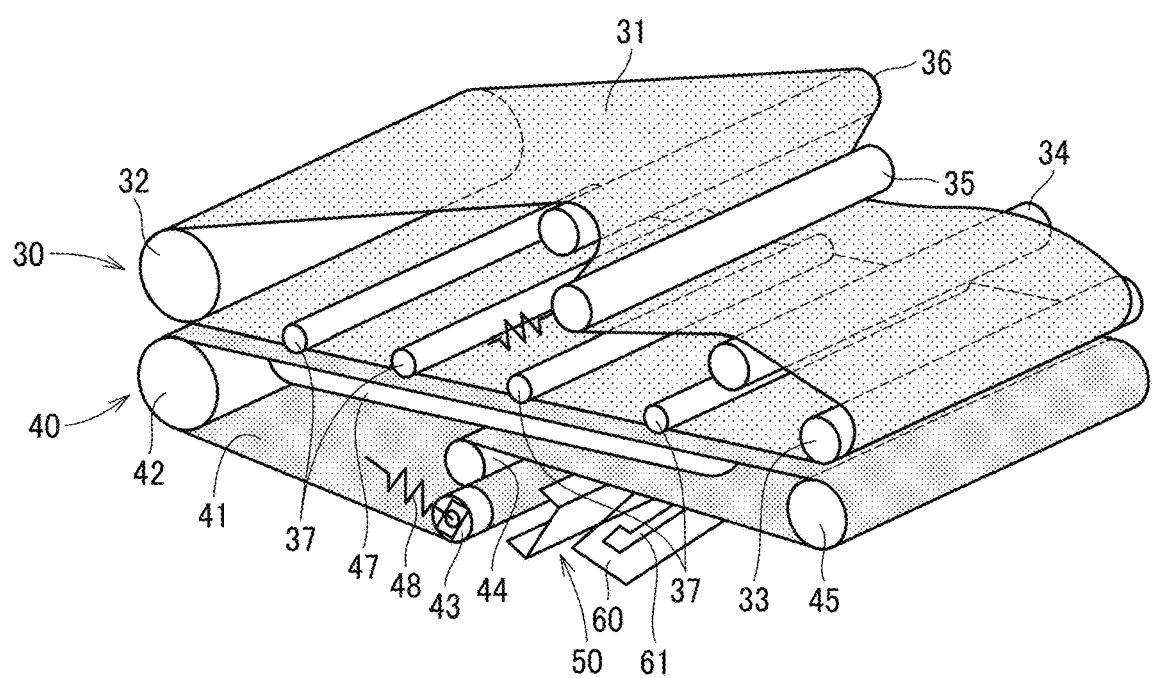
FIG. 10 is a perspective view of a belt conveyor in which rollers other than a detachable roller are tension rollers, according to an embodiment of the present disclosure.

In FIG. 10, compression springs 48 that serve as biasing members to apply tension to the lower belt 41 are attached to the roller 43 below the roller 44. In this case, the roller 44 held by the roller holder 50 does not need the compression springs 46 illustrated in FIGS. 5A and 5B.

In other words, the bearings 58 of the roller 44 can be fixedly arranged onto the support plate 57. Accordingly, when the roller holder 50 is moved in the front-rear direction as illustrated in FIGS. 7A, 7B, and 7C, the roller 44 is highly unlikely to swing unstably. Accordingly, the possibility that the roller 44 contacts other components around the roller 44 can be reduced.

Third Modification

FIGS. 11A, 11B, and 11C illustrate the guide groove 61 according to a third modification of the above-described embodiment of the present disclosure. In FIG. 11A, the center of the entrance-and-exit hole 62 is aligned with the center of the groove width of the guide groove 61.

In this case, when the weight of the rear portion of the roller holder 50 is put on the guide 60 via the guided portion 53, the shaft portion 53b of the guided portion 53 is engaged with a lower portion of the entrance-and-exit hole 62. For this reason, the position of the roller holder 50 in the front-rear direction can be restricted by the entrance-and-exit hole 62. Accordingly, the hand supporting the front portion of the roller holder 50 can be stably exchanged.

In FIG. 11B, the center of the entrance-and-exit hole 62 is shifted upward from the center of the groove width of the guide groove 61. In other words, the entrance-and-exit hole 62 is formed offset to a side opposite to a lower end of the guide groove 61 in FIG. 11B along which the shaft portion 53b of the guided portion 53 is guided to slide.

In this case, when the weight of the rear portion of the roller holder 50 is put on the guide 60 via the guided portion 53, the shaft portion 53b of the guided portion 53 is positioned at the front end of the lower edge of the first linear portion 63 of the guide groove 61. Accordingly, the movement of the roller holder 50 into the rear side of the lower belt-conveyor unit 40 can be smoothly started along the first linear portion 63.

In FIG. 11C, a reinforcing member 68 is disposed to reinforce the guide groove 61 of the guide 60. The guide groove 61 extends in the longitudinal direction of the guide 60. Accordingly, the guide 60 may bend when a large weight of the roller holder 50 acts on the guide 60. If the guide 60 bends as described above, the roller holder 50 may be hampered from moving smoothly in the front-rear direction.

Accordingly, as illustrated in FIG. 8C, both lateral sides of the guide groove 61 are connected by the reinforcing member 68 to cover an upper side of the guide groove 61. Such a configuration as described above allows the load resistance of the guide 60 to be enhanced. Accordingly, the guide 60 can be prevented from being bent. In a case in which the present embodiment is applied to a large-sized belt conveyor in which the roller 44 is long, such enhancement in the load resistance of the reinforcing member 68 facilitates increase in the length of the guide 60 or extension of the length of the guide 60 in which the guide 60 is pulled out.

Fourth Modification

FIG. 12 illustrates a supporting structure of the lower belt-conveyor unit 40, according to a fourth modification of the above-described embodiment of the present disclosure. As the supporting structure of the lower belt-conveyor unit 40, typically, it is conceivable that a structure as illustrated in FIG. 4C is employed. In this support structure, when the holder 76 is detached to detach the roller holder 50, no component supports the front plate 80.

In other words, if the front plate 80 is not supported by hand, the front plate 80 and the bottom plate 95 fall onto the support plate 75. Accordingly, this structure may need, for example, a jig that temporarily supports the front plate 80 and the bottom plate 95.

For this reason, in the support structure of FIG. 12, a lower end of the front plate 80 and a front end of the bottom plate 95 are connected by a pair of supports 70 on the left side and the right side of FIG. 12. The number of supports 70 is any number of two or more depending on the weight and size of the lower belt-conveyor unit 40. Removing only the support 70 on the right side while leaving the support 70 on the left side in FIG. 12 allows the roller holder 50 to be attached to and detached from the front plate 80.

FIGS. 13A, 13B, 13C, and 13D illustrate a configuration of facilitating attachment and detachment of the support 70 of FIG. 12 to and from the front plate 80. In other words, engagement holes 71 and 72 are formed at a lower end and an upper end, respectively, of the support 70. Engagement pins 85 and 96 as engaging portions detachably engaged with the engagement holes 72 and 71, respectively, are disposed at the lower end of the front plate 80 and the front end of the bottom plate 95.

The engagement pins 85 and 96 may have the same shape. In FIGS. 13A, 13B, 13C, and 13D, the shaft portions 85b and 96b are connected to the flange portions 85a and 96a, respectively. A base end of the shaft portion 85b and a base end of the shaft portion 96b are fixed to the lower end of the front plate 80 and the front end of the bottom plate 95, respectively.

The center of the disc-shaped flange portion 85a and the center of the disc-shaped flange portion 96a are coupled with the tip end of the shaft portion 85b and the tip end of the shaft portion 96b, respectively. The flange portion 85a is larger in diameter than the shaft portion 85b. The flange portion 96a is larger in diameter than the shaft portion 96b.

On the other hand, each of the engagement holes 71 and 72 at the lower end and the upper end of the support 70 has a so-called keyhole shape having a rectangular notch in a part of a circular portion. The engagement holes 71 and 72 are formed such that the notches of the engagement holes 71 and 72 face each other, in other words, the notches face each other in the vertical direction.

The circular portion of the engagement hole 71 is formed to be slightly larger than the flange portion 96a of the engagement pin 96. The circular portion of the engagement hole 72 is formed to be slightly larger than the flange portion 85a of the engagement pin 85. Accordingly, the flange portions 85a and 96a of the engagement pins 85 and 96 can be disengaged from the circular portions of the engagement holes 72 and 71, respectively.

On the other hand, the notch of the engagement hole 71 has a size that allows the shaft portion 96b of the engagement pin 96 to be fitted in the notch of the engagement hole 71. The notch of the engagement hole 72 has a size that allows the shaft portion 85b of the engagement pin 85 to be fitted in the notch of the engagement hole 71. Accordingly, as illustrated in FIG. 13A, the shaft portions 85b and 96b of the engagement pins 85 and 96 are constantly fitted into the notches of the engagement holes 72 and 71, respectively. The supports 70 are unlikely to be detached in the state as described above. Accordingly, the flange portions 85a and 96a of the engagement pins 85 and 96, respectively, function as safety devices.

Disengagement of Engagement Pin of Front Plate

When the roller holder 50 is detached, the front plate 80 is lifted as illustrated in FIG. 13B. Then, the engagement pin 85 of the front plate 80 moves to the circular portion at the upper end of the engagement hole 72.

When the upper end of the support 70 is inclined to the front side of the roller holder 50, i.e., the right side in FIG. 13, from the above-described state as illustrated in FIG. 13C, the engagement pin 85 can be disengaged from the engagement hole 72 as illustrated in FIG. 13D. The engagement pin 96 at a lower side of FIG. 13D can also be disengaged from the engagement hole 71 by slightly lifting the support 70.

As described above, the support 70 can be easily detached. Accordingly, the roller holder 50 can be quickly detached. When the lower belt 41 is replaced and the roller holder 50 is mounted, performing a procedure reverse to the above-described procedure allows the mounting operation of the roller holder 50 to be quickly performed.

Although several embodiments of the present disclosure have been described above, embodiments of the present disclosure are not limited to the embodiments described above, and a variety of modifications can naturally be made within the scope of the present disclosure. For example, in the embodiments described above, the roller holder 50 of the roller 44 of the lower belt-conveyor unit 40 is guided by the guide 60 to be attached to and detached from the lower belt-conveyor unit 40. However, a roller holder that holds the tension roller 35 of the upper belt-conveyor unit 30 may be guided by another guide to be attached to and detached from the upper belt-conveyor unit 30. Further, the belt conveyor is not necessarily limited to the belt conveyor including the upper belt-conveyor unit 30 and the lower belt-conveyor unit 40 as a pair of conveyors as illustrated in FIGS. 4A and 4B. The roller attachment-and-detachment device according to an embodiment of the present disclosure can be employed for a belt conveyor as long as the belt conveyor includes an endless belt wound around multiple rollers.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A device for attaching and detaching, as a detachable roller, at least one of a plurality of rollers in a belt conveyor in which an endless belt is wound around the plurality of rollers arranged between a front plate and a rear plate of the belt conveyor, the device comprising:
   a guide having a base end to be supported by the rear plate on a rear side of the device, the guide extending along a longitudinal direction of the detachable roller from the rear side to a front side of the device, when the base end is supported by the rear plate, the guide including a guide groove extending in the longitudinal direction of the detachable roller; and
   a roller holder including:
      an engagement portion to detachably engage with the front plate;
      another engagement portion to detachably engage with the rear plate; and a guided portion to slide along the guide groove of the guide toward the rear side or the front side of the device to engage or disengage the engagement portion with or from the front plate and engage or disengage said another engagement portion with or from the rear plate.

2. The device according to claim 1,
wherein the guide groove includes an inclined portion at an end of the guide groove on the rear side of the device, and
wherein the roller holder and the detachable roller are movable along the inclined portion in a direction in which the endless belt is stretched.

3. The device according to claim 1, further comprising a biasing member between the detachable roller and the roller holder to apply tension to the endless belt.

4. The device according to claim 1,
wherein the guided portion includes:
a shaft portion to slide along the guide groove; and
a flange portion at an end of the shaft portion, the flange portion having a width larger than a groove width of the guide groove.

5. The device according to claim 4,
wherein the base end of the guide is attached to the rear plate in a state of being inclined with respect to the rear plate such that the shaft portion of the guided portion is slidable along one-side edge of the guide groove.

6. The device according to claim 5,
wherein the guide includes an entrance-and-exit hole at an end of the guide groove on the front side of the device, and
wherein the flange portion of the guided portion is insertable into and removable from one side of the guide to another side of the guide through the entrance-and-exit hole.

7. The device according to claim 6,
wherein the entrance-and-exit hole is formed offset to a side opposite to the one-side edge of the guide groove in a width direction of the guide groove.

8. The device according to claim 1,
wherein the roller holder includes a pair of positioning pins to fit into a pair of rear-side positioning holes of the rear plate, and the pair of positioning pins are at an end of the roller holder on the rear side of the device.

9. The device according to claim 1,
wherein the roller holder includes a pair of positioning protrusions to fit into a pair of front-side positioning holes of the front plate are at an end of the roller holder on the front side of the device.

10. The device according to claim 1,
wherein the roller holder includes a contact portion at an end of the roller holder on the rear side of the device,
wherein the guide includes an auxiliary guide along the guide groove of the guide, and
wherein the contact portion is slidable along the auxiliary guide when the guided portion of the roller holder slides along the guide groove of the guide.

11. A belt conveyor comprising the device according to claim 1,
wherein the rear plate is disposed on a rear face of a housing of the belt conveyor,
wherein the rear plate is connected to a bottom plate of the belt conveyor, and
wherein a front end of the bottom plate on the front side of the device is connected to the front plate by a plurality of detachable supports.

12. The belt conveyor according to claim 11,
wherein an engagement pin at an upper end of the front plate is engaged with an engagement hole at an upper end of the support, and
wherein an engagement pin at the front end of the bottom plate is engaged with an engagement hole at a lower end of the support.

13. The belt conveyor according to claim 12,
wherein the engagement pin at the upper end of the front plate is detachable from an upper end of the engagement hole at the upper end of the support.

14. The belt conveyor according to claim 11, further comprising an upper belt-conveyor unit and lower belt-conveyor unit, and
wherein the upper belt-conveyor unit and the lower belt-conveyor unit nip a conveyed medium between the upper belt-conveyor unit and the lower belt-conveyor unit to convey the conveyed medium.

15. An image forming apparatus, comprising:
a belt conveyer;
the plurality of rollers; and
the device according to claim 1.

16. A belt conveyor, comprising:
a front plate disposed at one side of the belt conveyor;
a rear plate disposed at another side of the belt conveyor;
an endless belt disposed between the front plate and rear plate;
a plurality of rollers which are wound by the endless belt, wherein at least one roller of the plurality of rollers is movable between a fixed position and a non-fixed position, and the at least one roller is indirectly supported by the front plate and the rear plate when the at least one roller is in the fixed position;
a guide supported by the rear plate, the guide including a groove extending along a longitudinal direction of the at least one roller; and
a roller holder to hold the at least one roller, wherein
the roller holder includes a slider which is slidably supported by the groove, and
the slider is slidable along the groove such that the at least one roller is movable from the fixed position to the non-fixed position.

17. The belt conveyer according to claim 16,
wherein the roller holder further includes:
a first engagement portion to be engaged to the front plate when in the fixed position, and
a second engagement portion to be engaged to the rear plate when in the fixed position,
wherein the slider is slidable along the groove such that the first engagement portion and the second engagement portion are movable from the fixed position to the non-fixed position.

18. The belt conveyor according to claim 17,
wherein the groove includes an inclined portion at an end of the groove, and
wherein the roller holder and the at least one roller are movable along the inclined portion in a direction in which the endless belt is stretched.

19. The belt conveyor according to claim 17, further comprising a biasing member between the at least one roller and the roller holder, the biasing member to apply tension to the endless belt.

20. An image forming apparatus, comprising:
the belt conveyor according to claim 16; and
a device for attaching and detaching the at least one roller as a detachable roller.

* * * * *